UNITED STATES PATENT OFFICE.

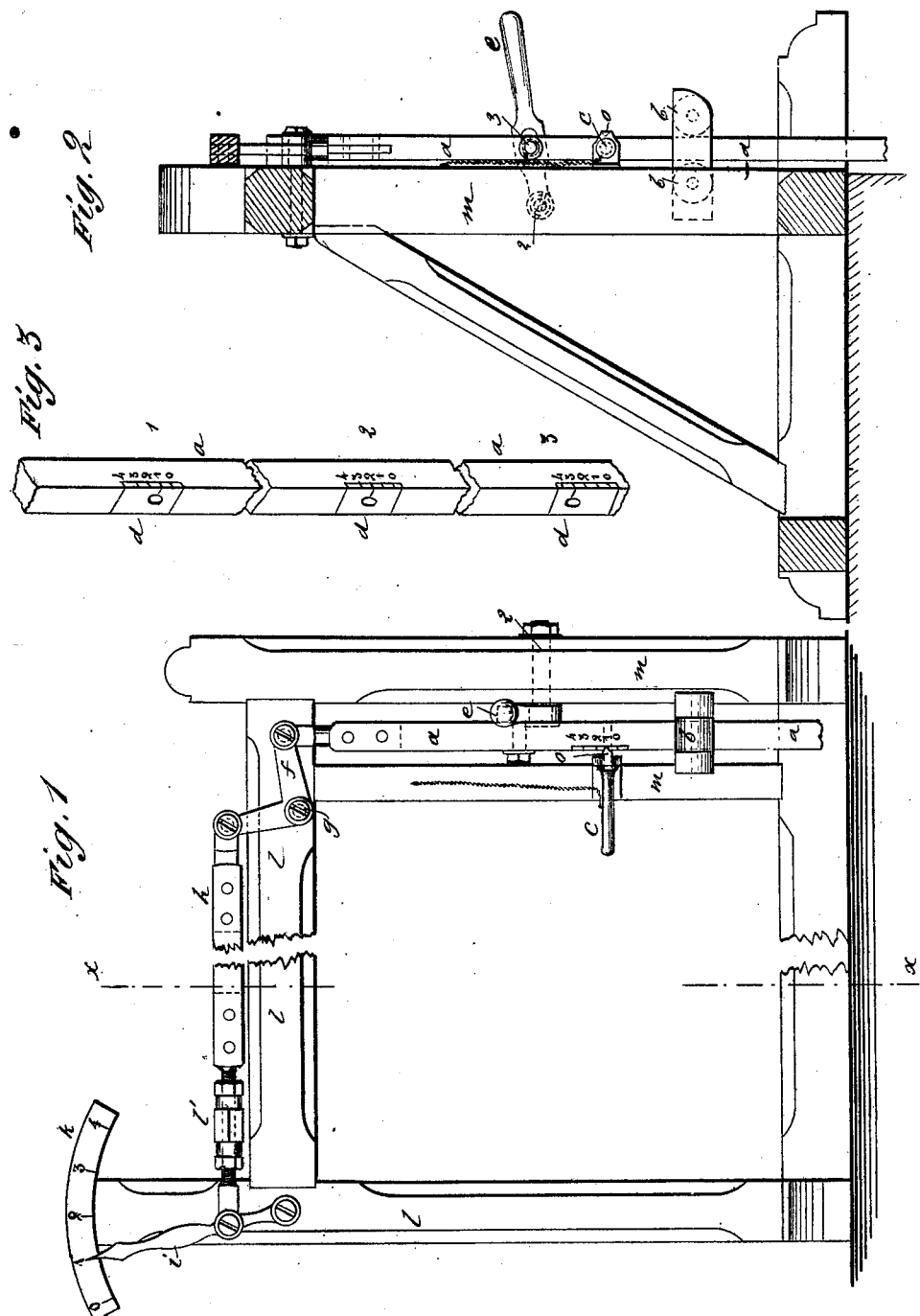

WILLIAM ROBERTS, JR., OF CALUMET, MICHIGAN, ASSIGNOR TO HIMSELF AND JOHN DANIELL, OF SAME PLACE.

IMPROVEMENT IN SIGNALING APPARATUS.

Specification forming part of Letters Patent No. 206,749, dated August 6, 1878; application filed May 22, 1878.

*To all whom it may concern:*

Be it known that I, WILLIAM ROBERTS, Jr., of Calumet, in the county of Houghton and State of Michigan, have invented a new and Improved Signaling Apparatus, of which the following is a specification:

In mining operations delays occur and accidents frequently happen because the means of communication from the levels to the engineer in charge of the hoisting machinery at the surface are limited and imperfect.

The object of my invention is to provide means whereby the engineer can be notified when and where a car has arrived at the shaft, so that the skip can be run to that level and the car hoisted to the surface without delay. I make use of a vertical upright signaling rod or bar or other suitable device, extending from the surface of the ground to the bottom of the shaft. This rod is supported in suitable bearings, and is provided with levers, so it can be raised and lowered by the workmen at the levels. I also provide means for locking the signaling-rod at each level, and combine with the rod indicators for showing the signals.

In the accompanying drawing, Figure 1 is an elevation, showing the surface-indicator and the upper end of the signaling-rod. Fig. 2 is a vertical section at the line $x$ $x$; and Fig. 3 is a detached view of the signaling-rod, showing the holes for the locking-pins and the indicating-scales in their relative positions at each level.

Similar letters of reference indicate corresponding parts.

$a$ is the vertical signaling-rod, extending down into the shaft to the lowest level, and supported, between the rollers $b$, upon the frame-work $m$ of the shaft. At each level the rod $a$ is provided with a hole for a stop-pin, $c$. $d$ is a plate upon the frame-work at the levels. There is a hole in this plate $d$ to allow of the insertion of the stop-pin $c$ through the plate and into the hole in the rod $a$ when the two holes coincide, thereby locking the rod $a$, and preventing any movement until the stop-pin $c$ is removed. There are numbers on the rod $a$, and a pointer, $o$, on the plate $d$, at each level, and the relative position of the numbers, pointers, and holes in the rod $a$ is such that no other can be inserted while one is in use, and the pointer $o$ will indicate the number of the level where the apparatus is locked.

The rod $a$ is operated by a hand-lever, $e$, secured upon the frame-work $m$ at each level by a fulcrum-pin, 2, and connected by a pin, 3, through a slot in the lever $e$ to the rod $a$.

The movement of the rod by the workmen at the levels is the signal to the engineer in charge of the hoisting machinery, and the distance which the rod moves shows exactly where the rod $a$ is being operated and locked.

To render the apparatus more convenient in cases where the starting-lever of the hoisting machinery is at a distance from the mouth of the shaft, the indicator and connections shown in Fig. 1 may be used. These consist of a crank-lever, $f$, on a fulcrum, $g$, connected at one end to the rod $a$ and at the other to the connecting-rod $h$. The connecting-rod $h$ communicates the motion of the rod $a$ to the indicator-hand $i$, and shows the signal upon a dial, $k$. An alarm may be used in connection therewith. These parts are fixed upon suitable frame-work $l$ $l$ in the shaft-house.

An adjusting-nut, $l'$, upon the connecting-rod $h$ may be used to shorten or lengthen the rod $h$ to compensate for variations in the temperature.

The operation is as follows: If the skip is wanted at level No. 1, the person arriving there depresses the rod $a$ by the hand-lever $e$ until the stop-pin $c$ can be inserted through the plate $d$ into the hole in the rod $a$, which hole at this level is opposite the figure 1. This movement turns the indicator-hand $i$ to the figure 1 upon the disk $k$, and the indicators of the other levels now point to 1 also. If, in the meanwhile, a car should arrive at level No. 2 or No. 3, the workman in charge of it sees at once that the skip is in use at level No. 1, and he cannot operate the signaling-rod, even if he should attempt it, until it is unlocked by the removal of the stop-pin $c$ at level No. 1. The person in charge of the hoisting machinery sees where the skip is wanted and runs it to the level shown by the indicator. When ready to hoist, the workman at level No. 1 removes the stop-pin and returns the hand $i$ to zero by operating the lever $e$ and raising the rod $a$. This is the signal to the engineer to hoist, and the workman at the level 2 or 3 at the same time sees the apparatus is free for him to operate.

I do not limit myself to the form of signaling-rod shown, nor to the particular devices described for indicating the signal or for locking the signaling-rod, as they may be varied without departing from my invention.

Having thus fully described my invention, I claim as new and desire to secure by Letters Patent—

1. The combination of rod *a*, working between rolls *b*, the stop-pin *c*, working in hole of said rod, and the plate *d*, having stop-pin hole, as and for the purpose described.

2. The stop-pins *c*, in combination with the rod *a*, said rod *a* having indicating-marks and holes for the stop-pins, substantially as set forth.

WILLIAM ROBERTS, JR.

Witnesses:
WILLIAM A. BRAY,
W. C. WATSON.